(12) United States Patent
Stinson et al.

(10) Patent No.: US 6,908,558 B2
(45) Date of Patent: Jun. 21, 2005

(54) FOUNTAIN SOLUTION RECYCLING SYSTEM FOR COMMERCIAL PRINTERS

(76) Inventors: David J. Stinson, 8002 E. Ridge La., Woodstock, GA (US) 30189; David A. Douglas, 817 Palm Desert Dr., Garland, TX (US) 75044; Roy E. Seibert, 2616 Greenway Dr., McKinney, TX (US) 75070; Jose A. Villarreal, 18060 County Rd. 4056, Kemp, TX (US) 75143

( * ) Notice: Subject to any disclaimer, the term of this patent is extended or adjusted under 35 U.S.C. 154(b) by 56 days.

(21) Appl. No.: 10/392,215

(22) Filed: Mar. 19, 2003

(65) Prior Publication Data

US 2004/0182796 A1 Sep. 23, 2004

(51) Int. Cl.[7] .................. B01D 37/00; B01D 29/56; B41M 1/06
(52) U.S. Cl. .............. 210/660; 210/767; 210/805; 210/806; 210/252; 210/258; 210/259; 210/282; 210/287; 210/502.1; 101/425; 101/483; 101/450.1
(58) Field of Search ................... 210/660, 767, 210/805, 806, 807, 252, 258, 259, 282, 287, 502.1; 101/425, 483, 450.1

(56) References Cited

U.S. PATENT DOCUMENTS

| | | | | |
|---|---|---|---|---|
| 181,597 A | * | 8/1876 | Robertson | 106/31.32 |
| 2,389,730 A | * | 11/1945 | Iler | 101/147 |
| 3,896,730 A | * | 7/1975 | Garrett et al. | 101/425 |
| 3,949,668 A | * | 4/1976 | Smith, Jr. | 101/148 |
| 3,959,129 A | * | 5/1976 | White et al. | 210/667 |
| 4,009,657 A | * | 3/1977 | Bonanno et al. | 101/157 |
| 4,384,523 A | * | 5/1983 | Ryan | 101/210 |
| 4,391,638 A | * | 7/1983 | Fusco et al. | 106/31.64 |
| 4,565,638 A | * | 1/1986 | Zucker | 210/774 |
| 4,574,695 A | * | 3/1986 | Ryan | 101/148 |
| 4,608,158 A | * | 8/1986 | Ghisalberti et al. | 210/96.1 |
| 4,738,785 A | * | 4/1988 | Langston et al. | 210/738 |
| 4,754,779 A | * | 7/1988 | Juhasz | 137/565.33 |
| 4,778,604 A | * | 10/1988 | Leonard et al. | 210/664 |
| 4,818,284 A | * | 4/1989 | McKelvey | 106/31.32 |
| 4,874,515 A | * | 10/1989 | McKelvey | 210/360.1 |
| 5,017,291 A | * | 5/1991 | Semler et al. | 210/641 |
| 5,124,736 A | * | 6/1992 | Yamamoto et al. | 396/631 |
| 5,177,975 A | * | 1/1993 | Mertens | 62/64 |
| 5,181,467 A | * | 1/1993 | Takekoshi | 101/147 |
| 5,200,094 A | * | 4/1993 | Hill et al. | 210/768 |
| 5,201,943 A | * | 4/1993 | Monnerat | 106/31.13 |
| 5,344,573 A | * | 9/1994 | Hill et al. | 210/768 |
| 5,415,091 A | * | 5/1995 | Junghans | 101/147 |
| 5,489,379 A | * | 2/1996 | Meenan et al. | 210/167 |
| 5,505,863 A | * | 4/1996 | Danon et al. | 210/774 |
| 5,622,620 A | * | 4/1997 | Meenan et al. | 210/130 |
| 5,628,914 A | * | 5/1997 | Prasil | 210/770 |

(Continued)

FOREIGN PATENT DOCUMENTS

JP 2001260310 A * 9/2001 ............. B41F/7/24

OTHER PUBLICATIONS

English language Abstract of JP 2001260310 A; Copyright 2001—Japanese Patent Office.*

Primary Examiner—Robert James Popovics
(74) Attorney, Agent, or Firm—Michael A. O'Neil

(57) ABSTRACT

A method of and apparatus for extending the life of fountain solutions used in commercial printing presses comprises withdrawing fountain solution from the dampener recirculation system of a printing press and directing the withdrawn fountain solution through a sediment prefilter, a separation filter, and a posttreatment filter. The sediment prefilter preferably comprises a melt blown polypropylene filter; the separation filter preferably comprises a diatomaceous earth filter; and the post-treatment filter preferably comprises a zeolite filter.

1 Claim, 2 Drawing Sheets

U.S. PATENT DOCUMENTS

| | | | |
|---|---|---|---|
| 5,734,944 A | * 3/1998 | Seeley et al. | 396/565 |
| 5,811,224 A | * 9/1998 | Seeley et al. | 430/399 |
| 5,828,923 A | * 10/1998 | Harabin et al. | 396/626 |
| 6,126,336 A | * 10/2000 | Ferrante | 396/565 |
| 6,153,107 A | * 11/2000 | Ogawa et al. | 210/710 |
| 6,224,273 B1 | * 5/2001 | Ferrante | 396/565 |
| 6,247,856 B1 | * 6/2001 | Shibano et al. | 396/565 |
| 6,293,198 B1 | * 9/2001 | Mizuno | 101/483 |
| 6,488,754 B2 | * 12/2002 | McPherson et al. | 106/163.01 |

* cited by examiner

FOUNTAIN SOLUTION RECYCLING SYSTEM FOR COMMERCIAL PRINTERS

TECHNICAL FIELD

This invention relates generally to improvements in commercial printing systems and more particularly to a system for removing contaminants from and thereby extending the life of fountain solutions utilized in commercial printing plants.

BACKGROUND AND SUMMARY OF THE INVENTION

A typical offset lithographic printing press has a plate cylinder upon which the negative of the text and illustrations to be printed are etched by a photographic and/or an electronic process. Dampening rollers apply a fountain solution to the plate cylinder which adheres to the plate cylinder except in the areas in which the text and illustrations are located.

Next, a series of form rollers, also known in the art as inking rollers, apply a layer of ink to the plate cylinder. The ink adheres to the plate cylinder only in the etched areas comprising the text and illustrations.

The plate cylinder then presses the inked text and illustrations onto a rubber blanket cylinder. An impression cylinder then presses a sheet of paper or other substrate to be printed against the blanket cylinder as the paper or other substrate passes between the blanket cylinder and the impression cylinder. The inked text and illustrations on the blanket cylinder are transferred onto the paper or other substrate to effect printing thereof.

Over time, ink, paper fiber, spray powder, and other contaminants build up in the fountain solution. These contaminants negatively impact print quality. Additionally, as the fountain solution degrades water, adjustments are required. Eventually the fountain solution becomes so contaminated that it needs to be replaced. The present invention comprises a system for minimizing fountain solution contamination thereby extending the useful life of the fountain solution by a substantial period of time.

The fountain solution recycling system of the present invention utilizes a unique multi-stage separation technology and a recirculation pump to clean and restore the fountain solution. Removal of contaminants is achieved by processing the solution through three separate treatment stages resulting in a reusable, stabilized fountain solution. Components of the fountain solution which are consumed due to carry-off by the printing substrate and evaporation are replaced in the conventional manner.

Use of the fountain solution recycling system of the present invention easily and reliably reduces costs and improves productivity in an aspect of the commercial printing business that has traditionally been neglected. Simply extending the life of the fountain solution typically adds 1–2 hours of productivity per week per printing press because changing the fountain solution and cleaning the system are no longer required.

Additionally, by extending the life of the fountain solution waste, disposal costs associated with fountain solution replacement are dramatically reduced. In those instances in which spent fountain solution is drained, use of the present invention greatly reduces the copper, zinc, ink, glycols, phosphates and suspended solids going into the drain thereby lessening the impact on the environment.

BRIEF DESCRIPTION OF THE DRAWINGS

A more complete understanding of the present invention may be had by reference to the following Detailed Description when taken in connection with the accompanying Drawings, wherein.

DETAILED DESCRIPTION

Figure 1:
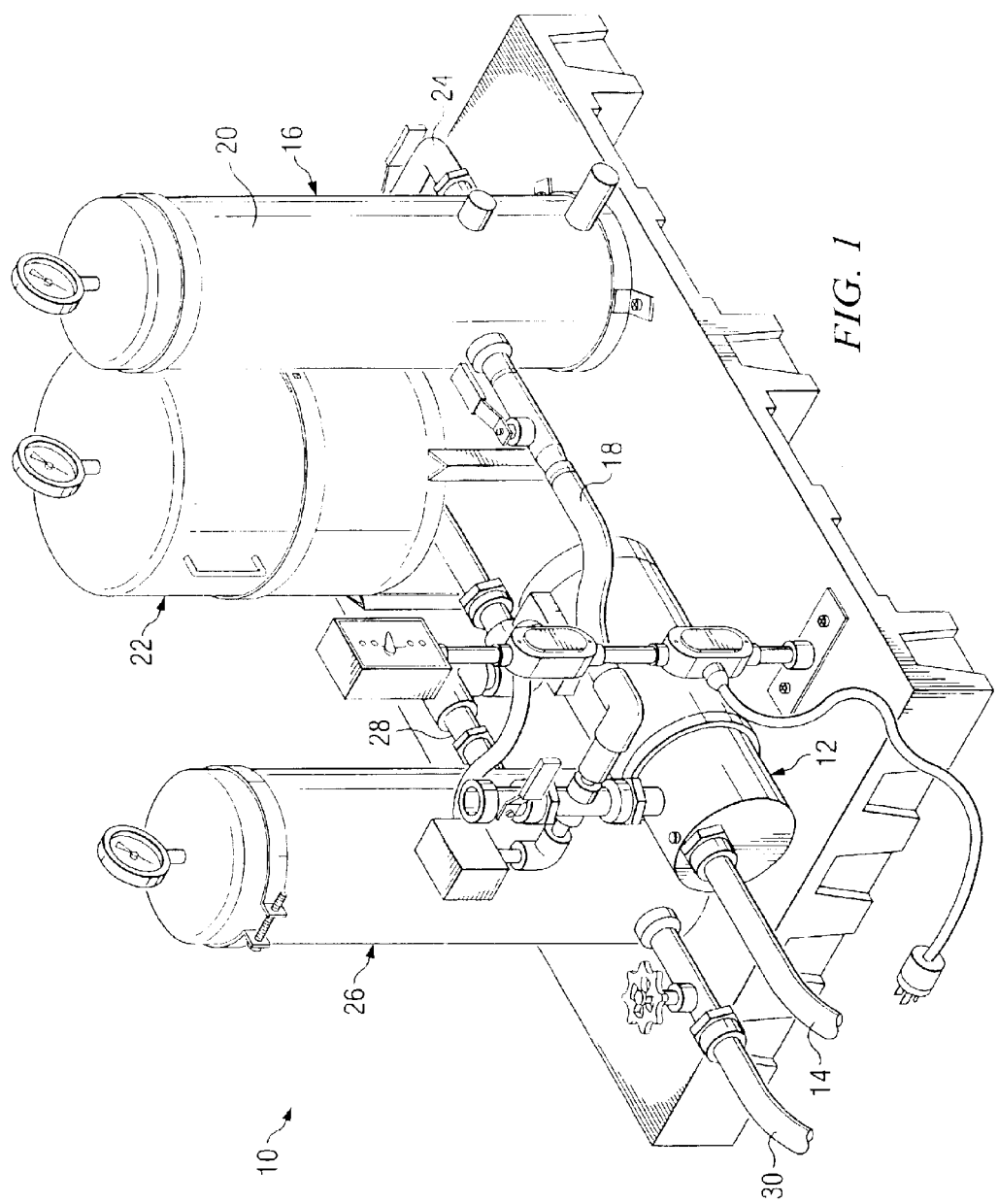
FIG. 1 is a perspective view of a fountain solution recycling system for commercial printers incorporating the invention.

Referring now to the Drawings, and particularly to FIG. 1 thereof, there is shown a fountain solution recycling system 10 incorporating the present invention. The system 10 includes a pump 12 which receives fountain solution from a commercial printing press through a line 14. The output of the pump 12 is directed to a sediment prefilter 16 through a line 18. The sediment prefilter 16 comprises a housing 20 which contains a strainer or filter formed from melt blown polypropylene and having a consistency generally similar to that of a fibrous web. The function of the sediment prefilter 16 is to remove relatively large particles from the flowing fountain solution.

From the sediment prefilter 16 the fountain solution is directed to a separation cartridge 22 through a line 24. The separation cartridge 22 comprises a housing which contains a diatomaceous earth filter and functions to remove submicron sized particles from the flowing fountain solution. Thus, having passed through the sediment prefilter 16 and the separation cartridge 22 the fountain solution is substantially free of particulate and colloidal contaminants.

From the separation cartridge 22 the fountain solution is directed to a post treatment cartridge 26 through a line 28. The post treatment cartridge 26 comprises a housing which contains a natural zeolite filter material which removes copper ions, zinc ions, and other ions from the flowing fountain solution thereby substantially removing metal ion contaminants from the fountain solution. After flowing through the post treatment cartridge 26 the fountain solution is returned to the dampener recirculating device of the commercial pressing press through a line 30.

The sediment prefilter 16, the separation cartridge 22, and the post treatment cartridge 26 comprise a three stage treatment system in which each stage has a symbiotic relationship with the former stage. The use of the combined system comprising the prefilter 16, the separation cartridge 22, and the post treatment cartridge 26 affords two highly beneficial results. First, the use of the combined system substantially extends the life of fountain solution flowing therethrough. Second, the combined system renders the fountain solution much more environmentally friendly upon ultimately disposal.

Figure 2:
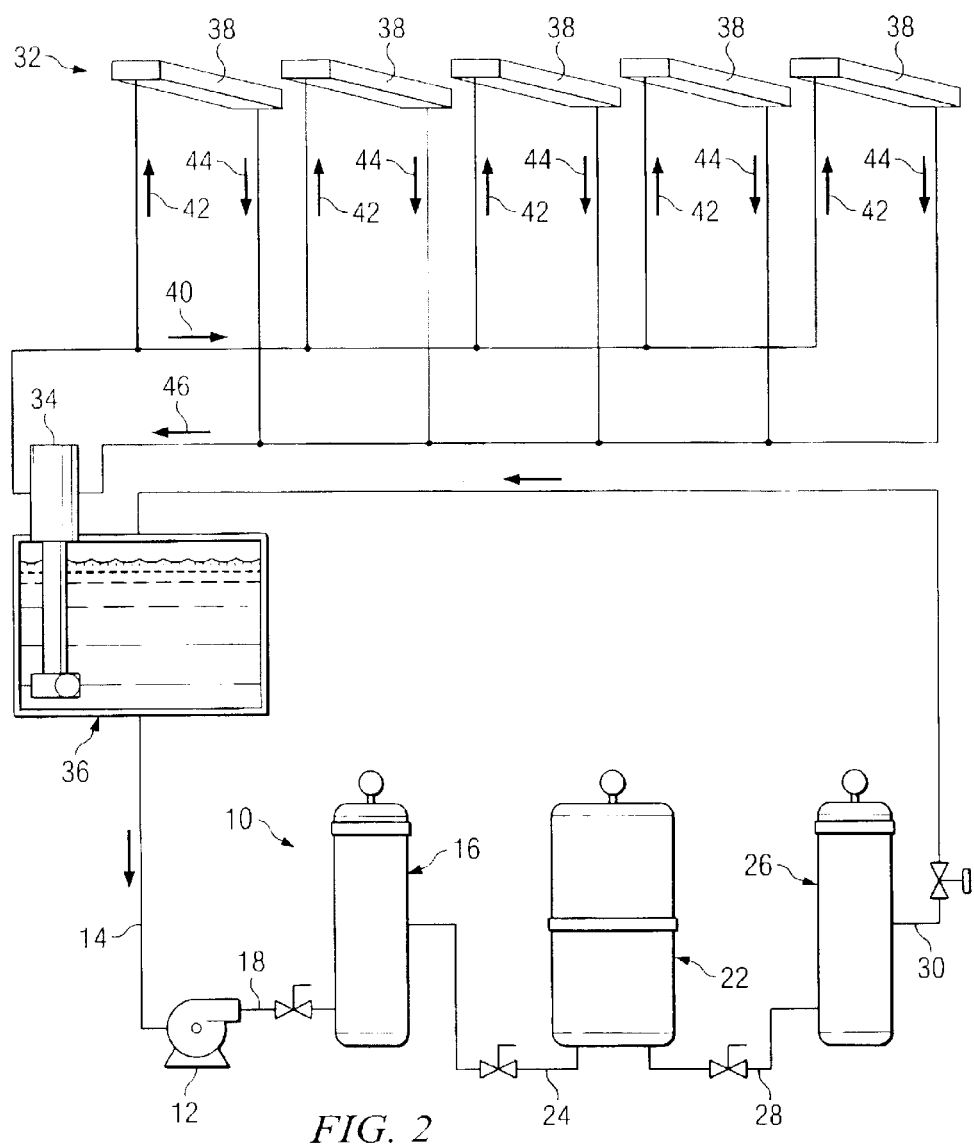
FIG. 2 is a schematic illustration of the fountain solution recycling system of FIG. 1 and the interaction thereof with a commercial printing press.

FIG. 2 illustrates the use of the fountain solution recycling system 10 in conjunction with a commercial printing press 32. A recirculation pump 34 withdraws fountain solution from a fountain solution recirculation tank 36 and directs the fountain solution to one or more printing press dampener pans 38 as indicated by the arrows 40 and 42. From the printing press dampener pans 38 the fountain solution is applied to dampening rollers which in turn apply the fountain solution to the plate cylinder of the printing press 32. In the operation of the printing press 32 fountain solution is continuously withdrawn from the printing press dampener pans 38 and returned to the tank 36 as indicated by the arrows 44 and 46.

The fountain solution recycling system 10 of the present invention withdraws fountain solution from the tank 36 through the line 14 and returns the fountain solution to the tank 36 through the line 30. Thus, the system 10 of the present invention functions to maintain the fountain solution within the tank 36 in a substantially clean condition characterized both by a lack of particulate contamination and a reduction of metal ion contamination.

As is best shown in FIG. 1, the components of the fountain solution recycling system of the present invention may be mounted on a pallet. By mounting all of the components of the system on a pallet, installation of the system at a convenient location within a commercial printing plant is readily accomplished. All that remains to be done is the connection of the lines 14 and 30 to one or more printing presses within the plant, whereupon operation of the system can be commenced.

EXAMPLE

A typical eight-color 40"0 printing press requires the disposal of about 40 gallons of fountain solution per week, or about 2100 gallons per year. 2100 gallons equals about 40 barrels of spent fountain solution that must be disposed of annually. At a typical disposal cost of about $250/barrel the annual fountain solution disposal cost is about $10,000 per year per printing press. Conversely, when the present invention is used the annual fountain solution disposal requirement is about 2 barrels or about $500 per year per press. Elimination of press downtime for fountain solution change out is another benefit resulting from the use of the present invention. At just one hour of eliminated downtime per week the use of the present invention saves over $15,000 per year per press. When down time savings are combined with disposal cost savings use of the present invention results in about $25,000 in annual savings per press.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A method of maintaining the quality of commercial printing press fountain solutions including the steps of:
   providing a first container;
   providing a sediment prefilter comprising melt blown polypropylene;
   positioning the sediment prefilter within the first container;
   providing a second container;
   providing a separation cartridge comprising a diatomaceous earth filter;
   positioning the separation cartridge within the second container;
   providing a third container;
   providing a post treatment cartridge comprising a natural zeolite filter;
   positioning the post treatment cartridge within the third container;
   withdrawing fountain solution from a commercial printing press;
   directing the withdrawn fountain solution sequentially through the first container and the sediment prefilter therein, the second container and the separation cartridge therein, and the third container and the post treatment cartridge therein; and
   returning the fountain solution from the third container to the commercial printing press.

\* \* \* \* \*

UNITED STATES PATENT AND TRADEMARK OFFICE
CERTIFICATE OF CORRECTION

PATENT NO.       : 6,908,558 B2                                                 Page 1 of 1
APPLICATION NO.  : 10/392215
DATED            : June 21, 2005
INVENTOR(S)      : Roy E. Seibert et al.

It is certified that error appears in the above-identified patent and that said Letters Patent is hereby corrected as shown below:

ON THE COVER PAGE

IN REFERENCES CITED

Patent No. 5,017,291 replace "Semler" with --Semier--.

IN THE SPECIFICATION

Col. 1, line 61, replace "of the fountain solution" with --of the fountain solution,--
Col. 1, line 62, replace "waste, disposal" with --waste disposal--.
Col. 3, line 23, replace "40"0" with --40"--.

Signed and Sealed this

Eleventh Day of March, 2008

JON W. DUDAS
*Director of the United States Patent and Trademark Office*